United States Patent [19]
Lee et al.

[11] 3,951,789
[45] Apr. 20, 1976

[54] NOVEL HIGH DIFFUSIVITY MEMBRANES
[75] Inventors: Lester T. C. Lee, Parsippany; Win-Sow Ho, Wharton; Kang-Jen Liu, Somerville, all of N.J.
[73] Assignee: Allied Chemical Corporation, New York, N.Y.
[22] Filed: Oct. 11, 1973
[21] Appl. No.: 405,389

[52] U.S. Cl. .......................... 210/22 C; 210/321 A; 210/500 M; 264/41
[51] Int. Cl.² .................. B01D 31/00; B01D 13/00
[58] Field of Search .......... 260/72 N, 2.5 N, 32.6 N, 260/89.7 N, 78 TF, 78 A, 78 SC; 210/500, 321, 22 C; 264/41

[56] References Cited
UNITED STATES PATENTS
3,567,632   3/1971   Richter et al. .................. 210/321 X
3,686,116   8/1972   Rio ................................ 210/321 X Primary Examiner—Frank A. Speer, Jr.
Attorney, Agent, or Firm—Arthur J. Plantamura

[57] ABSTRACT

Novel membrane compositions are prepared from polymers comprising tertiary amine containing polyamideamine functional groups. The membranes are durable, highly selective and have excellent homogeneity and high diffusivity. Asymmetric membranes can be prepared by solution casting or melt processing techniques can be used to produce homogeneous, high performance, symmetric membranes. The specific compositions of the membranes can be adjusted so as to achieve a membrane possessing a required degree of hydrophilicity and porosity. These membranes may be used in a variety of separation applications, particularly in two-phase solvent extraction.

16 Claims, No Drawings

NOVEL HIGH DIFFUSIVITY MEMBRANES

BACKGROUND OF THE INVENTION

Field of the Invention

The present invention is directed to the preparation of a novel class of membranes comprising a polymer containing a polyamideamine functional group of the formula:

$$\left[ \begin{matrix} O & O \\ \| & \| \\ -C-X-C-NH-Y-NH- \end{matrix} \right]_n$$

wherein:

X is selected from the group consisting of $R_1$,

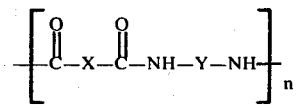

Y is selected from the group consisting of $R_7$,

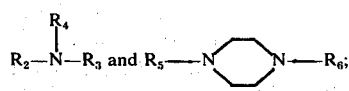

wherein:

$R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bisphenylene alkylene and substituted diradicals thereof wherein the substituents are selected from the group consisting of oxygen, sulfur and nitrogen; and wherein $R_4$ and $R_{10}$ are organic radicals selected from the group consisting of alkyl, cyclic alkyl and phenyl;

with the proviso that at least one of X and Y as defined above contains a tertiary amine group; and wherein:

n is an integer designating the repeating monomeric units of the polymer.

The novel membrane compositions herein can be produced as asymmetric membranes by solution casting; or more significantly, homogeneous high performance, symmetric membranes may be produced using melt processing techniques.

Moreover, we have found that by incorporating a compatible additive or compatible high molecular weight matrix polymer with the polyamideamine, durable, chemically resistant membranes can be produced having controllable hydrophilicity and porosity.

The membranes formed using the systems of the present invention may be adapted for use in such applications as solvent extraction, dialysis, reverse osmosis, ultrafiltration, gas-liquid absorption, pervaporation, gas-gas separation, etc.

The membranes of the invention are particularly useful in the form of hollow fibers, flat sheets or tubes in the solvent extraction process described in our copending application Ser. No. 320,341, filed Jan. 2, 1973.

In the membrane solvent extraction process disclosed in that application, two substantially immiscible liquids, B and C, are separated by a membrane so there is no phase-to-phase contact between the two liquids. During the extraction, the solute A, dissolved in liquid B, diffuses from the liquid B into and across the membrane and ultimately passes into the liquid C. Hollow fiber membranes are advantageously employed in this process since they provide a large mass transfer area per unit volume as the mechanism for selectively extracting the solute from one liquid medium and depositing it into a second liquid medium without requiring direct contact between the two media. For use in such two-phase extraction systems, the membrane must possess a high degree of diffusivity, i.e., preferably about $10^{-7}$ to $10^{-6}$ cm$^2$/sec, it must permit to bulk-solution diffusion, and be chemically stable to solvents or acid or basic mediums.

BRIEF DESCRIPTION OF THE PRIOR ART

The membranes presently employed in the art in operations involving ultrafiltration, pervaporation, reverse osmosis, etc., are based primarily upon cellulose acetate. These cellulose-based membranes exhibit the desired high water flux and low salt passage; however, they have a limited operating lifetime and decreased performance during operation due to chemical and mechanical instability. Certain aliphatic substituted polyamide resins have been used as bases for membranes; however, they have either lower overall permeation properties or inferior physical strength. Aromatic polyamide-based membranes, as described in U.S. Pat. No. 3,567,632, are also in use which, although they are strong, exhibit low flux rates due to their low hydrophilicity. These aromatic polyamide-based membranes are solely adapted to reverse osmosis systems wherein high pressures in the order of 1000 psig are used to force the desired components through the membranes. Since these operations rely on the pressure gradient, they do not require the high degree of diffusivity which is required for solvent extraction operations. Moreover, reverse osmosis membranes have comparatively limited applications because they are relatively nonselective and customarily permeable only to the solvent, e.g., water. Accordingly, reverse osmosis membranes are not ordinarily useful in separating the dissolved components of a solution as is often required. Further, when used to treat solutions containing high molecular weight material such as proteins or dissolved organic matter, they tend to get clogged or readily poisoned as the organic matter is selectively absorbed by the membrane.

This organic matter will then either coat the surface or make it hydrophobic and thereby prevent the transport of water across it.

An additional disadvantage of the membranes presently employed is that it is difficult to control the hydrophilicity while retaining the other required properties of the system.

There is thus a need for a novel membrane wherein the degree of hydrophilicity may be regulated according to the requirements of the particular separation system. Moreover, these membranes must possess relatively high diffusivity and mechanical strength and must be thermally and chemically stable.

SUMMARY OF THE INVENTION

In accordance with the present invention we have found that substantially improved high strength membranes characterized by water content of 5–75% and a degree of diffusivity greater than about $10^{-8}$ cm$^2$/sec are prepared from polymeric systems containing a polyamideamine of the general formula:

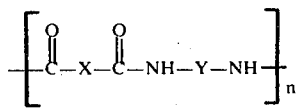

wherein:
X is selected from the group consisting of $R_1$,

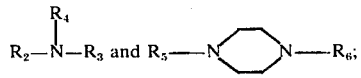

Y is selected from the group consisting of $R_7$,

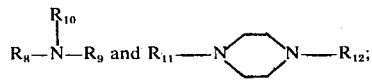

wherein:
$R_1$, $R_2$, $R_3$, $R_5$, $R_6$, $R_7$, $R_8$, $R_9$, $R_{11}$ and $R_2$ are organic diradicals independently selected from the group consisting of alkylene, cyclic alkylene, phenylene, phenyl dialkylene, bisphenylene alkylene and substituted diradicals thereof wherein the substituents are selected from the group consisting of oxygen, sulfur and nitrogen; and wherein $R_4$ and $R_{10}$ are organic radicals selected from the group consisting of alkyl, cyclic alkyl and phenyl;
with the proviso that at least one of X and Y as defined above contains a tertiary amine group; and wherein:
$n$ is an integer designating the repeating monomeric units of the polymer.

The polymers used to prepare the membranes of this invention are thus chosen from a limited class of synthetic, oganic, tertiary-nitrogen containing homopolymers and copolymers having a unique combination of controllable hydrophilicity and high selectivity which ideally suit them for various separation applications, particularly solvent extraction If desired, any matrix polymer material which is compatible with the polyamideamine may be included in the membrane system to increase the mechanical strength and to control any excessive swelling of the membrane system. The matrix material also serves to increase the melt viscosity of the membrane system during melt spinning processes.

Advantageously, a processing additive may be used in the preparation of the membrane and is subsequently removed from the system before use of the membrane. The additive serves to loosen or "open-up" the structure of the membrane while maintaining its high strength characteristics so that the diffusion rate will be enhanced in the porous membrane.

The membranes may be prepared by conventional solution casting methods in which an asymmetric membrane is derived by casting a film from a solution onto a glass or Teflon surface and drying for a sufficient extent and/or coagulating in a liquid in order to remove the solvent. If a processing additive has been employed, it is then leached-out to provide a membrane with desired pore size.

The novel membranes of the invention may also be produced using a melt processing technique which comprises premixing and melt blending the material, extruding and quenching the melt to form pellets and then melt-extruding the pellets to produce flat or hollow-fiber membranes having symmetric structures.

The flat membranes may be used in a conventional manner; the hollow fibers may be assembled for use in permeators, such as described in U.S. Pat. No. 3,339,341. Alternatively, the membranes may be used as thin coatings on porous substrates or as thin films on porous substrates. The porous substrates may be shaped as tubes, flat plates, corrugated sheets, etc. as is known in the art.

The resulting membrane systems are chemically stable with controlled pore size and hydrophilicity, and possess high diffusivity in the range of about $10^{-6}$ to $10^{-7}$ cm$^2$/sec.

Moreover, the membranes prepared according to the teachings of this invention have a most advantageous additional attribute in that they are less-fouling. Membrane fouling is one of the critical problem areas in membrane technology. We have found that the membranes having compositions in accordance with the invention not only do not become fouled in use but also are most valuable as a means for the pretreatment of waste or processing streams prior to other treatments.

Thus, this invention provides a novel membrane systems which are useful for a variety of applications. For example, these membranes possess the required high diffusivity and controllable hydrophilicity needed for two-phase solvent extraction processes, as well as the strength required for reverse osmosis techniques. Additionally, when used as ultrafiltration media, the membranes of the present invention may be used to separate dissolved materials using a variant of the reverse osmosis process. Moreover, the novel membranes may be used in separation processes involving passive diffusion of materials across the membrane by virtue of concentration gradients in passive dialysis. These membranes may also be employed in gas-liquid or gas-gas separation operations such as those which require removal of methane, $CO_2$, CO or $SO_2$ from gaseous or liquid solutions.

DESCRIPTION OF THE PREFERRED EMBODIMENT

The present invention is directed to novel membrane compositions. The membrane products are durable and highly selective and have excellent homogeneity and high diffusivity. These compositions may be solution cast to form novel asymmetric membranes. Moreover, they can be processed by melt processing techniques to produce novel, homogeneous high performance, symmetric membranes. Additionally, the specific compositions of these membranes may be adjusted so as to achieve a membrane possessing a required degree of hydrophilicity and porosity. Thus, the membranes of the present invention have a wide variety of applications in membrane separation technology, particularly for two-phase solvent extraction.

The process of the present invention may use a variety of polymeric formulations, provided, however, that there be present in the system from 5 to 100% of a polymer containing a polyamideamine functional group having the general tertiary amine structure:

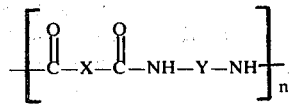

polyamideamine polymer may be used. Suitable matrix polymers include hydrophobic polymers and copolymers of the type which are readily available and which may be dissolved and suitably cast on a substrate to be thereafter separated; they may be self-sustaining or retained as a composite with the substrate. Illustrative of such polymeric matrix materials are polyacrylonitrile; polymerized esters of acrylic and methacrylic acid; polyvinylchloride; polyvinylfluoride; polyvinylidine chloride; polyvinylidine fluoride; polyvinylbutyral; polystyrene; polyarylmethyl styrene; polycarbonate; polymethylmethacrylate; polyolefins; polyamides such as nylon 6 and nylon 6,6; polyesters such as polyethyleneterephthalate; polyarylsulfones; polyphenylenesulfides; polyphenyl ethers; and the like. If the polyamideamine is co-polymerized, it is possible for the copolymer to function as the matrix material.

The addition of matrix polymers in amounts as little as 5 percent will serve to add structure to the membrane system and will aid in melt processing, however larger amounts, i.e. up to about 95 percent of matrix material may be used with the polyamideamine to form the novel membranes. Preferred membrane systems contain matrix polymers in amounts of 30 to 60 percent by weight.

Processing additives, useful in amounts of 0.5 to 50 percent, preferably 10 – 30 percent, may be employed provided the additive meets the following requirements:

1. It is compatible with the polyamideamine and matrix polymer in solution or melt processing;
2. It has a minimum degree of exchange reaction with the polyamideamine and the matrix polymer during extrusion; and
3. It is easily removed, as by leaching-out with common solvents.

Suitable additives include: lauryllactam, caprolactam, adipamide, acetamide, pentaerythrital tetraacetate, lithium chloride, lithium nitrite, potassium chloride, etc.

Although the membranes formed using the compositions of the present invention have been found to possess superior dimensional stability, even after long periods of operation, the dimensional stability may be further increased by cross-linking the mixture to further prevent dissolution or swelling of the membrane when the membrane is used in particular solvent systems. Cross-linking may be attained either by incorporating a suitable cross-linking agent or by subjecting the membrane to a condition, such as radiation, which induces cross-linking. Any agent may be employed which is capable of promoting cross-linking of the matrix component of the particular system. Suitable cross-linking agents include formaldehyde, diisocyanates, epoxy resins, epichlorohydrin, butadiene diepoxide, polystyrene maleic anhydride, etc.

An essential feature in the membranes of the present invention involves their controllable hydrophilicity. It has been found that the hydrophilicity of the final membrane may be controlled by regulating the number of tertiary nitrogen groups present in the polymeric chain. By way of illustration, if a copolymer is prepared by copolymerizng BAMPA/adipic acid salt and hexamethylene 1,6-diamine/adipic salt, the hydrophilicity of the final membrane can be controlled by varying the ratio of the two salts. Such a copolymer, having the general formula:

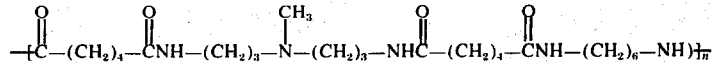

has been found to possess a desirable degree of hydrophilicity even when 50 percent by weight of the nylon salt is used in the copolymer composition. Moreover, this copolymer has higher molecular weight than the homopolymer so is particularly useful during the melt extrusion of hollow fiber membranes.

We have found that the degree of hydrophilicity may also be effectively regulated by varying the proportions of polyamideamine and matrix material. Since the polyamideamines used in the present invention are extremely hydrophilic, the addition of increasing amounts of matrix polymer will serve to correspondingly decrease the hydrophilicity of the system. Thus, amounts of 0-15 percent matrix polymer may be used if extremely high diffusivity is required in the membrane while amounts of about 50 – 95 percent would be used for very strong, relatively low hydrophilic membranes.

Moreover, in membtane systems formed using solution casting techniques the porosity and thus the hydrophilicity may be controlled by employing polyamideamine polymers and matrix polymers which have reasonably uniform cross-sectional diameter, i.e., they do not have large aromatic rings or other substituents in side groups, thus the polymer has a more orderly structure and the membrane has a more compact morphology. For example, for a very fine pore permeable structure, one would employ the BAMP polymer together with a film-forming polymer such as polyvinylchloride-acrylonitrile copolymer or polyvinylidine fluoride with an epoxide as cross-linking agent. In systems of this kind, also, avoidance of the bulky benzene ring is achieved and there is less tendency to fouling in such membranes because of the absence of the aromatic structure.

Following similar reasoning, the control of the hydrophilicity and the porosity in either solution casting or melt processing systems may also be controlled by varying the difunctional organic acid used in the preparation of the polyamideamine. Thus, if an acid such as terephthalic, containing an aromatic radical is employed, the diffusivity of the resulting polyamideamine will be significantly lower than if a difunctional straight chain acid is employed.

Additionally, since the porosity and therefore a degree of the hydrophilicity of the membrane system is controlled by the particular additive chosen, it is apparent that larger molecular size additives may be used to increase the pore size of the membrane and smaller size additives to correspondingly decrease the hydrophilicity.

The membrane may be prepared by casting a film from a solution containing the polyamideamine, optional matrix polymer and additive; drying to an extent sufficient to remove the solvent and then removing any additive by solvent leaching at a later stage. When this solution casting technique is employed, the wherein:
X is selected from the group consisting of $R_1$,

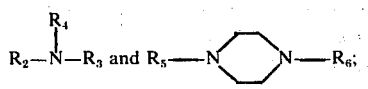

Y is selected from the group consisting of $R_7$,

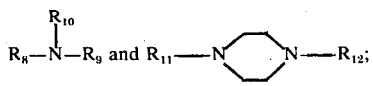

wherein:
$R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bisphenylene alkylene and substituted diradicals thereof wherein the substituents are selected from the group consisting of oxygen, sulfur and nitrogen; and wherein $R_4$ and $R_{10}$ are organic radicals selected from the group consisting of alkyl, cyclic alkyl and phenyl;
with the proviso that at least one of X and Y as defined above contains a tertiary amine group; and wherein:
$n$ is an integer designating the repeating monomeric units of the polymer.

The polymer may contain the polyamideamine in the form of the homopolymer or it may be combined to produce a copolymer.

The tertiary amine-containing polyamideamines may be prepared by the polycondensation of the corresponding mono-substituted amine or piperazine and a difunctional organic acid as represented by the general formula:

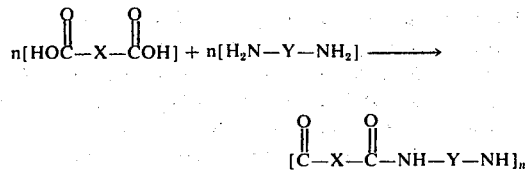

Thus, the tertiary amine components used to produce the polyamideamines may be chosen from a wide range of compositions including straight-chain tertiary amine-containing compounds such as bis(aminopropyl)methylamine, bis(aminoethyl)methylamine, N-(aminopropyl) N'(aminomethyl)methylamine, bis(carboxypropyl)methylamine, etc. and such cyclic tertiary amine-containing compounds such as N,N'-di(aminomethyl)-piperazine, N,N'-di(aminomethyl)-methylpiperazine, N,N'-di(β-aminoethyl)piperazine, N-(aminomethyl)-N'-(β-aminoethyl)piperazine, N,N'-di(β-aminopropyl)piperazine.

In addition to the alkyl substituted compounds mentioned above, phenyl substituted amines as bis(aminopropyl)phenylamine; and bis(amino-p-phenyl)methylamine; cyclic alkylenes as bis(amino-propyl)cyclohexylamine and bis(amino 1,6-cyclohexyl)methylene; phenyl dialkylene substituted amines as bis-(amino-p-xylene(methylene and bis-henylene alkylene substituted amines as bis(amino-bis-phenylmethyl)-methylene; or any similarly substituted difunctional organic acids may be employed. Generally, the number of carbon atoms in each of $R_1$ through $R_{12}$ will vary from 1 to 18 carbon atoms, preferably 4 to 12 carbon atoms. If the particular R is an alkyl or alkylene radical it will contain 1 to 6 carbon atoms, if a cyclic alkyl or alkylene radical, it will contain 3 to 7 carbon atoms; if a phenyl or phenylene radical, it will contain 6 carbon atoms; and if a combination thereof, as would be represented by the general formulas:

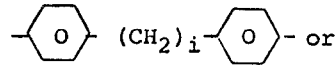

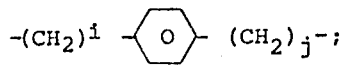

it will contain 7 to 18 carbon atoms depending on the values of the integers i and j. Moreover, any of the hydrocarbon radicals present, except those represented by $R_4$ and $R_{10}$ in the general formula defined above may contain oxygen, nitrogen and sulfur substituents; representative compounds include bis(amino-p-phenylether)methylamine and bis(amino-p-phenylsulfone)methylamine.

A preferred polyamideamine is poly[1,7(4-methyl)azaheptyladipamide] (hereinafter sometimes referred to as BAMP). This particular polymer may be prepared by the polycondensation of bis(aminopropyl)methylamine (BAMA) and adipic acid as represented by the formula:

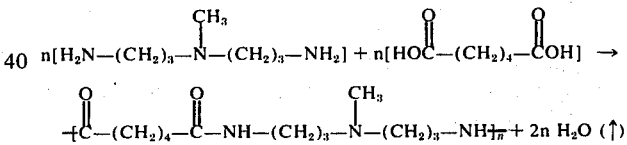

The bis(3-aminopropyl)methylamine may be obtained from BASF Wyandotte Corporation, or prepared according to the following reaction.

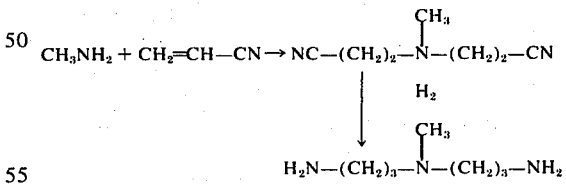

A similar monomer may be prepared as follows:

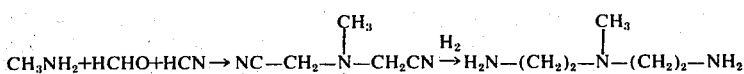

Advantageously, matrix polymers may be used in the novel polyamideamine containing membrane systems of the invention. These matrix materials may be chosen from a wide variety of polymers which are compatible with and are capable of dissolution in the same solvent with, or may form a homogeneous solution with, the polyamideamine and the film-forming matrix polymer generally will be of a nature such that it may be preferable to employ a co-solvent system to uniformly dissolve all the ingredients. However, in some instances, it has been found that a single solvent is all that is necessary to form suitable membranes. The solvent system must be such that films are producible therefrom and should dissolve substantially all of the polyamideamine, the matrix polymer, and when present, the additive and/or the cross-linking agent.

Various solvents may be used and give satisfactory results depending on the specific polymer or copolymer, matrix polymer and additives; solvents which may be employed in practicing the invention include 2, 2',2''-trifluoroethanol, dimethylformamide (DMF), hexamethylphosphorictriamide (HMP), dimethylacetamide, N,N-dimethylacetamide and N,N,N',N'-tetramethoxyamide may be used. Suitable solvents specific to the BAMP polymer may be drawn from a wide variety of materials, particularly good results being obtainable by using a co-solvent blend of 4 to 12 parts of hexamethylphosphorictriamide per part of dimethylformamide. A co-solvent system may be used which combines a solvent for the film-forming matrix material with one for the BAMP polymer. A system of this kind may employ, for example, various ratios of dimethylformamide and dimethyl sulfoxide. In some cases such as with dimethylformamide, it is not necessary to use an additional solvent for the BAMP polymer. However, the two-solvent system is preferred due to the fact that the films thus formed often have improved performance over those produced from a single solvent system.

In forming the solutions of the plastic film-forming material and the polyamideamine, care may be necessary in proportioning the solvents where such solvents are mutually exclusive in their polar and nonpolar characteristics. As a specific example, where the BAMP polymer is soluble in polar solvents as DMF and HMP the correct proportions shall be determined by experimentation, otherwise the BAMP polymer may be coagulated from the solution, thus making it difficult to cast a film containing this material.

After the polyamideamine and optional matrix material, additive and cross-linking agent have been suitably dissolved in a given solvent or solvent system, they are then formed by any suitable mechanical means into thin films. One method for the preparation of membranes of the present invention is based upon the evaporation of the solvent leaving a film cast upon a suitable surface or mold. The material may be poured on a continuous moving belt that has provision for controlled heat which will allow the film to dry. The membrane thus formed is then immersed in a suitable solvent to leach-out any additive, thereby increasing the porosity of the membrane.

In addition to casting membranes by drying them on a suitable surface, the novel membranes of the present invention may be prepared by drying on a rotating drum. This procedure involves casting the membranes on a highly polished chromiumplated drum with the drum rotated on its axis in a horizontal position by an adjustable speed motor and gear assembly. A 250 watt infrared bulb is placed above the drum so that the temperature of the drum is maintained at the desired value. When the temperature of the drum attains equilibrium, a pan of casting solution is placed under the drum so it extends into the solution approximately ½ inch. The drum is rotated in this casting solution for a period of time and the pan is removed. Rotation is continued until the membrane dries and can then be removed by rotating in a pan of deionized water.

The membranes may also be formed from solutions by spraying upon porous surfaces which act as bases, supports or frameworks to strengthen the films and make them more adaptable for use in electromechanical apparatus. In this particular adaptation, extremely thin films may be placed on rigid, porous backing members either by spraying or casting technique using dilute solutions. The porous backing members may be of any suitable material usually non-conductive, plastic screens; porous ceramic materials; insulated metal screens, and the like are suitable.

Other methods for casting the films from solutions other than by the techniques described may also be used with equal effectiveness.

In accordance with any of these solution casting techniques, the evaporation of the solvent from the casting solution may be accomplished at room temperature or the temperature may be above room temperature, but in no event should the heat applied exceed the decomposition point of the ingredients of the membrane.

The thickness of these films may be readily controlled by the amount of plastic film-forming material and BAMP content contained in the solvent or solvent system used to prepare the casting media or by controlling the thickness of the film cast.

As the drying progesses, the amount of solvent contained in the plastic film-forming material tends to be driven from the pores, and a mechanical tightening or contraction of the film surface tends to take place. At the end of a longer period, e.g., a 3 hour period, the pore areas become relatively fixed and more contracted than in the case of a shorter period of drying, e.g., 0.5 hour. Other conditions of time and temperature give corresponding results. At this stage, i.e., when the drying is advanced substantially, the films may be insolubilized by activating the cross-linking agent. In preparing membranes from a melt of the component polymer, control of the water absorption characteristics of the membrane is effected by varying the proportion of the polyamideamine in the polymer chain and the amount of additives used.

Useful membranes may also be prepared by spinning hollow fibers from the casting solutions described in this invention with suitable modifications of procedures applied in spinning processes such as by employing a higher solids content or higher temperature of spinning. Additionally, membranes can be made by casting these fomulations onto a preformed hollow fiber or tube of suitable dimensions such as by drawing the tube through the solution followed by drying and cross-linking of the solution.

The nature of these solution casting procedures, wherein a single solution is used containing all of the requisite components of the film, permits the formation of hydrophilic membranes which are extremely thin but still coherent and mechanically strong.

A significant aspect of the present invention is that the high performance membranes can be prepared from the polyamideamine containing polymers using melt processing techniques. The basic melt processing operation comprises melt blending the dry reactants, extruding and quenching the melt to produce pellets which are subsequently extruded using a ram extruder with a blown film attachment to produce a polymeric balloon or tube which can be cut into the desired sized flat membrane or used in its tubular form.

Superior hollow fiber membranes may also be prepared with similar melt processing techniques using extruders with specifically designed dies. Using these techniques, hollow fiber membranes having preferred dimensions of 100 to 150 $\mu$ outer diameter (O.D.), 90 to 120 $\mu$ interior diameter (I.D.) and wall thicknesses of 5 to 30 $\mu$ can be prepared.

These melt processing techniques can be adapted for use with any of the membrane systems described herein. When used with polymers possessing relatively low viscosity, it is desirable to add small amounts (i.e. less than 5 percent) of LiCl or KCl to increase the melt viscosity of the system thereby facilitating extrusion.

Layered membranes may also be formed by drying and partially, or wholly, curing a first layer in one of the foregoing manners and thereafter casting or extruding and drying a superimposed layer, or layers, in sequence. Because the films of the compositions of the present invention can be cast in a thickness of one micron or less, it is possible to form such layered membranes while still achieving high diffusivity for the system together with high selectivity.

In the examples which follow, the compositions and membranes were characterized using conventional evaluation procedures including:

Diffusivity (D) — the diffusion flux of a solute through the membrane between two substantially immiscible liquid phases. The diffusion flux can be expressed by Fick's equation as follows:

$$F = D \frac{dc}{dx} \qquad (1)$$

where $F$ = diffusion flux through the membrane; $D$ = diffusivity; $dc/dx$ = concentration gradient. A diffusivity (D) in the range of about $1 \times 10^{-9}$ to about $1 \times 10^{-4}$ cm$^2$/sec is required for a given extraction system. Usually, the diffusivity higher than $10^{-8}$ cm$^2$/sec is desirable. This value was measured in cm$^2$/sec using a two compartment diffusion cell to conduct the membrane solvent extraction. A membrane was mounted tightly between the two compartments; liquid B with solute A was introduced into one of the compartments, while liquid C was poured into the other compartment. Solute A was extracted by difussion from liquid B, across the membrane, and into liquid C. The concentration of A in B both before and after a predetermined diffusion period was analyzed using gas chromatography and the concentration of A in C calculated by material balance so as to obtain the diffusivity measurement.

Thickness (L) in microns measured using a thickness gauge with the water-wet membrane;

Water content (W) in % as grams of water per gram pf water-wet membrane;

Salt rejection (S.R.) in % was measured using a 0.5 M sodium chloride solution measured at 25°C. and employing a designated driving pressure (e.g. 600 psi) and reported as the concentration of the feed solution minus that of the product, the whole divided by the feed concentration and multiplied by 100.

The following examples are provided to more fully illustrate the invention. It will be understood that, because the examples are illustrative, they are not to be construed as limiting the invention, except as defined by the appended claims. All parts are by weight, except where otherwise expressly stated.

Example 1

The BAMP polymer salt was prepared as follows: 60 g. adipic acid (0.41 mole) was dissolved in 350 ml dimethylformamide (DMF) and 62 g BAMA (0.42 mole) in 100 ml DMF was added slowly with stirring to the adipic solution. The mixing was accompanied by spontaneous warming, and crystallization soon occurred. After standing overnight, the white salt was filtered, washed and dried, yielding 118 g. or 99% of the BAMA/adipic salt having a melting point of 145°C. The salt (700 g.) was introduced to a steel resin kettle equipped with mechanical stirrer, argon gas inlet and outlet. The poly-condensation was carried out first under reflux conditions at 185°C. under 200 psi argon gas pressure. After 2 hours, the pressure was slowly released, the condensed water was gradually distilled out and the temperature was raised to 210°C. After completing the distillation process, the kettle was subjected to high vacuum at 0.2 mm Hg and 240°C. for 40 to 60 minutes. The polymerization reaction was stopped by cooling down to room temperature. The yield of BAMP polymer was 630 g. and the polymer had a melting temperature (Tm) of 195°C. and glass transition temperature (Tg) of 40°C.

Examples 2–6

Copolymers were prepared by repeating the procedure of Example 1 and adding hexamethylenediamine-adipic salt to the BAMA/adipic salt in varying proportions. The properties of the polymer of Example 1 and the copolymers of Examples 2–6 are shown in Table 1 below:

Table 1

| Example | BAMA-Hexamethylene-diamine ratio (by wt) | Solution Viscosity NSP/C | Water Pick-Up % |
|---|---|---|---|
| 1 | 100:0 | 0.48 | 68.0 |
| 2 | 95:5 | 0.54 | 66.5 |
| 3 | 90:10 | 0.60 | 64.0 |
| 4 | 80:20 | 0.62 | 63.0 |
| 5 | 70:30 | 0.65–67 | 62.0 |
| 6 | 50:50 | 0.72 | 59.0 |

Example 7

A typical high diffusivity flat membrane prepared by solution casting can be illustrated by the following example. A solution was prepared by dissolving 4 parts of poly[1,7(4-methyl) azaheptyladipamide (BAMP)], 5 parts of high molecular weight (over 30,000) polycaprolactam (PLASKON 8205) and 1 part of lauryllactam in 2,2′2″-trifluoroethanol with final concentration of 10% by weight. This clear, homogeneous solution was filtered to remove dust particles through a sintered glass filter, then the solution was transferred to a centrifuge tube and centrifuged for 5 minutes to remove the air bubbles. The clear solution was cast on the glass plate with a Gardner Knife set at a suitable gate. The membrane so cast was placed level at room temperature until the solvent was completely evaporated. The membrane was easily separated from the glass surface, then the membrane was immersed in methyl alcohol to leach-out the lauryl-lactam. The membrane so obtained had a thickness of $9.2 \times 10^{-3}$ cm, and a water absorption of 42.8%.

The diffusivity of the membrane for solvent-extraction can be illustrated in the following example. A diffusion cell with two compartments maintained at ambient temperature and pressure was employed for the measurement. The membrane was mounted tightly between the two compartments. The membrane diffusion area was 16.75 cm². One compartment contained 80 g. of ε-caprolactam in 296 ml of H₂O solution while the other compartment contained 296 ml of chloroform. After the diffusion time of $7.0 \times 10^4$ sec, the concentration of ε-caprolactam in H₂O decreased to 0.197 g/ml and the amount of ε-caprolactam transferred to chloroform was 26.54 g. or 0.0851 g/ml. A diffusivity of $9.22 \times 10^{-7}$ cm²/sec. was obtained.

Example 8

The procedure of Example 7 was repeated using only a solution of BAMP in 2,2'2'' trifluoroethanol. The resulting membrane had a thickness of 5.0 mil, water content of 71%, exhibited high hydrophilicity and had a diffusivity on the order of $5 \times 10^{-6}$ cm²/sec.

Example 9

The procedure of Example 1 was followed for the /sec. of the membrane except that the composition consisted of 6 parts of BAMP and 4 parts of polycaprolactam, and no additive was employed. The membrane so obtained had a thickness of $1.64 \times 10^{-2}$ cm. The diffusivity was measured as in Example 7. Initially, there were 81.8 grams of ε-caprolactam in 300 ml of water, after a diffusion time of $8.16 \times 10^4$ sec., 5.38 g. of ε-caprolactam were transferred to 295.5 ml chloroform representing 0.182 g/ml. A diffusivity of $2.4 \times 10^{-7}$ cm²sec. was obtained.

Example 10

The procedure of Example 7 was followed for the membrane preparation except that the composition consisted of 36% of copolymer BAMP and hexamethyleneadipamide (weight, ratio 70:30) 49% of polycaprolactam, and 15% lauryl lactam. The membrane so obtained had a thickness of $2.28 \times 10^{-2}$ cm. The diffusivity, measured as in Example 7 using a ε-caprolactam/CHCl₃ system, was diffusivity of $2.0 \times 10^{-6}$ cm²/sec.

Example 11

The procedure of Example 7 was repeated using a solution of 6 parts BAMP, 3 parts poly-caprolactam and 1 part lauryl lactam. Shortly before membrane casting, 15% by weight of the total mixture of phenyl diisocyanate was added as a cross-linking agent. The solution was thoroughly mixed and the membrane cast. The resulting membrane had a diffusivity in the order of $10^{-7}$ and exhibited excellent mechanical strength properties.

Examples 12–14

Flat membranes were prepared using the method of Example 7 from the polyamideamine compositions shown in Table II.

Table II

| Example | Polyamideamine |
|---|---|
| 12 | Bis(aminopropyl)methylamine |
| 13 | N,N' di(aminomethyl)piperazine |
| 14 | N (aminomethyl)-N'-(β-aminoethyl) piperazine |

The resulting membranes in each case had high hydrophilicities, diffusivities in the range of $10^{-6}$ to $10^{-7}$ and superior mechanical strength.

Example 15

A typical high diffusivity flat membrane prepared by melt-process was prepared from a composition consisting of 40% BAMP, 40% polycaprolactam, 5% lithium chloride and 15% lauryl lactam which were thoroughly dried in powdered form. The mixture was melt blended in a screw-type extruder at 217°C. with a 5 minute residence time. The extruded filaments were quenched in water and cut into pellets with a Wiley Mill. The pellets were thoroughly dried at high vacuum for 40 hours to give a water content of less than 0.05%. A polymeric balloon was obtained from these pellets by using the ram extruder with a blown film attachment at 210°C. for a residence time of 7 minutes, then quenching with cooled nitrogen. Flat membranes were obtained by cutting the balloons into various sizes, then the lauryl lactam was leached-out with methyl alcohol. The membranes had a water content of 41.5%. After immersion in water for 48 hours, these membranes were ready for testing as in Example 7. A membrane having a thickness of $2.01 \times 10^{-2}$ cm. and diffusion area was 20.78 cm² was employed. Initially, there were 80 g. of ε-caprolactam in 296 ml of water after a diffusion time of $1.68 \times 10^5$ sec., a total of 8.32 g. of ε-caprolactam was transferred to the 294.5 ml of chloroform giving a diffusivity measurement of $1.87 \times 10^{-7}$ cm²/sec.

The high diffusivity of the membrane was illustrated in another system employing the solute 1,2-dichloroethane in 292.5 ml of water; after a diffusion time of $2.43 \times 10^5$ sec. using a membrane with a diffusion area of 20.8 cm², 052 g. of 1,2-dichloroethane was diffused into 292.5 ml of n-heptane. A diffusivity of $4.22 \times 10^{-7}$ cm²/sec. was obtained. The membrane composition performed equally well in dinitrotoluene (solute) in water extracted by toluene. A membrane with a thickness of $2.03 \times 10^{-2}$ cm. and a diffusion area of 20.8 cm² was used. Initially there were 60 g. of DNT in water; after a diffusion time of $1.73 \times 10^5$ sec., 0.014 g DNT were diffused into the 298.5 ml of toluene representing $44.9 \times 10^{-6}$ g/ml. The diffusivity of $6.06 \times 10^{-7}$ cm²/sec. was obtained.

The high diffusivity of this membrane composition was also exemplified in the following system: toluenediamine (TDA) in water was extracted by dinitrotoluene through the membrane. A membrane with a thickness of $1.3 \times 10^{-2}$ cm. and a diffusion area of 16.75 cm² was used. Initially, 2.91 g. of TDA was in 291 ml of HNO. After the diffusion time of $1.81 \times 10^5$ sec. in a 1.58 g. of TDA was diffused through the membrane into the 290 ml of dinitrotoluene at 70°C. A diffusivity of $1.06 \times 10^{-6}$ cm²/sec. was obtained.

Example 16

A membrane was obtained following the melt-processing procedure of Example 15 except that 6 parts BAMP and 4 parts Plaskon polycaprolactam were used. Since no additives were used, the resulting membrane was not subjected to leaching. The flat membrane had a thickness of $1.83 \times 10^{-2}$ cm. The diffusivity measurement was conducted in a manner similar to Example 7 using ε-caprolactam in water extracted by chloroform. For this experiment, the membrane diffusion area was 20.78 cm². The system contained 80.4 g of ε-caprolactam in 297.5 ml water initially; after a diffusion time of $1.41 \times 10^{-5}$ sec, the concentration of ε-caprolactam in water was determined to be 0.270 g/ml showing that 0.767 g of ε-caprolactam was diffused into 296 ml of chloroform. A diffusivity of $2.9 \times 10^{-8}$ cm²/sec was obtained.

Example 17

A membrane was obtained by following the melt processing procedure of Example 15 except that 4 parts BAMP, 5 parts Plaskon polycaprolactam and 10 parts lauryl lactam were used. The resulting membrane had a thickness of $2.48 \times 10^{-2}$ cm.

The diffusivity measurement was carried as in Example 7 using a membrane diffusion area of 20.78 cm². Initially 80.4 g of ε-caprolactam were present in 297.5 ml of water, after a diffusion time of $1.73 \times 10^5$ sec. 4.23 g of ε-caprolactam diffused into the 301 ml of chloroform giving a concentration of 0.0142 g/ml. A diffusivity of $1.11 \times 10^{-7}$ cm² sec was obtained.

The high diffusivity of the membrane was also illustrated in the following system involving the 1,2-dichlorethane as the solute in water extracted by n-heptane. A membrane with a thickness of $2.48 \times 10^{-2}$ cm. and diffusion area was 20.78 cm² was used. Initially, there were 2.07 g of 1,2-dichloroethane in 292.5 ml of water, after a diffusion time of $2.43 \times 10^5$ sec. 0.52 g of 1,2-dichloroethane was diffused into the 292.5 ml of n-heptane giving a final concentration of 0.00178 g/ml. A diffusivity of $4.22 \times 10^{-7}$ cm²/sec was obtained. This membrane performed equally well in a system using dinitrotoluene as the solute in water which was extracted by toluene. The membrane had a thickness of $2.03 \times 10^{-2}$ cm. and diffusion area of 20.18 cm². Initially there were 60 g of DNT (dinitrotoluene) in 301 ml of water; after a diffusion time of $1.73 \times 10^5$ sec, 0.0134 g of DNT was diffused into the 298.5 ml of toluene. A diffusivity of $6.06 \times 10^{-7}$ cm²/sec was obtained.

Example 18

The procedure of Example 15 was repeated to form a membrane using a composition consisting of 3.75 parts of BAMP 3.75 parts of Plaskon polycaprolactam, 2 parts of lauryl lactam and 0.5 parts of lithium chloride. The resulting membrane had a thickness $2.26 \times 10^{-2}$ cm. Diffusivity measurement was carried out as in Example 7. The membrane diffusion area was 20.18 cm². Initially there were 18.1 g of ε-caprolactam in 289 ml of water; after a diffusion time of $1.68 \times 10^5$ sec. 8.39 g of caprolactam was diffused into the 303.0 ml of chloroform. A diffusivity of $3.13 \times 10^{-7}$ cm²/sec was obtained.

Example 19

The procedure of Example 15 was repeated using a composition consisting of 3.48 parts of copolymer of [1,7-(4-methyl) azaheptyladipamide-hexamethyleneadipamide] in 70:30 weight ratio 4.77 parts of Plaskon polycaprolactam, 1.45 parts of lauryl lactam and 0.3 parts of lithium chloride. The resulting membrane had a thickness of $2.0 \times 10^{-2}$ cm, and a water content of 41.0%.

The diffusivity measurement was conducted as in Example 7 using a membrane with diffusion area of 20.18 cm². Initially, 83 g of ε-caprolactam was in 308 ml of water, after the diffusion time of $6.9 \times 10^{-4}$ sec, 34.7 g of ε-caprolactam was diffused into the 305 ml of chloroform. A diffusivity of $5 \times 10^{-7}$ sec/cm² was obtained.

Example 20

A high diffusivity hollow fiber for solvent extraction was prepared by melt-processing technique. The composition consisted of 3.58 parts of copolymer of [1,7(4-methyl) azaheptyladipamidehexamethyleneadipamide] (72:28 molar ratio) 4.92 parts of Plaskon polycaprolactam and 1.50 parts of lauryl lactam. The mixture was ground and thoroughly dried, then melt blended in a counter-current screw type extruder at 210°C for 3 minutes. The extruded filaments were quenched in ice-water and cut into pellets using a Wiley Mill. The pellets were thoroughly dried in high vacuum at 50°C for 48 hours to achieve a water content less than 0.5%.

Hollow fibers were made in an extruder using a specifically designed die. The dried pellets were fed into the screw type extruder and melted at 217°C for a residence time of 6 minutes. The melt viscosity of the polyblends was in the 4000 poise range at a shear rate of 60 sec$^{-1}$. The hollow fiber was quenched with cold air and the lauryl lactam leached out with methanol. The hollow fiber obtained had an outside diameter of 122 μm and a wall thickness of 22 μm.

A hollow fiber operational unit was prepared using 700 hollow fibers combined together with epoxy resins. The effective length of the unit was 24.2 cm with an inside diameter of the extractor of 0.59 cm. The efficiency of the hollow fiber unit for solvent extraction was demonstrated using O-dichloroketene (O-DCK) in water extracted by n-octane with the H₂O stream (Cil and Cio) flowing on the shell side (outside hollow fibers) and the n-octane (Col and Coo) stream flowing on the tube side (inside hollow fibers). The Cil and Cio (inlet streams) were analyzed using gas chromatography and the Col (outlet) calculated by material balance. The results of separate runs appeared in Table III below:

Table III

| Run No. | Flow Rate of H₂O Stream (ml/sec) | Flow Rate of n-C₈H₁₈ Stream (ml/sec) | CiL ($10^{-6}$ gm/ml) (ppm) | CiO ($10^{-6}$ gm/ml) (ppm) | COL ($10^{-6}$ gm/ml) (ppm) | COO ($10^{-6}$ gm/ml) (ppm) |
|---|---|---|---|---|---|---|
| 1 | 0.057 | 0.0044 | 6.0 | 0.6 | 97.3 | 0 |
| 2 | 0.010 | 0.0044 | 10.7 | r0 | 35.0 | 0 |
| 3 | 0.57 | 0.048 | 95.3 | 32.9 | 745 | 0 |
| 4 | 0.69 | 0.086 | 70.5 | 33.9 | 291.5 | 0 |
| 5 | 0.64 | 0.069 | 88.9 | 38.3 | 470.6 | 0 |
| 6 | 0.46 | 0.069 | 73.1 | 33.0 | 264.5 | 0 |
| 7 | 0.93 | 0.069 | 90.1 | 41.8 | 650.1 | 0 |

Example 21

The hollow fibers of Example 19 were used to form a permeator according to the method described in U.S. Pat. No. 3,339,341. The permeator was then used in reverse osmosis operation to desalinate a brine solution. Under an applied pressure of 800 psi the membrane system had a permeation rate of about 60 gal/ft$^2$/day/nicron with a salt rejection value higher than 90%.

The foregoing is illustrative of the wide range of variability useful properties than can be attained by an application of the teachings of this invention. It will be apparent that other variations may be made by one skilled in the art without departing from the invention claimed.

The membranes of the invention thus have a varied field of utility. For example, they may be used to separate two substantially immiscible liquids and extract a solid through the membrane as required in applications. Additionally, in the treatment of process streams and in control of pollution, it may frequently be desirable to reject one class of solutes while allowing others to pass through; the teaching herein provided allows one to tailor-make a membrane to fit a specific application using only a single formulation or a limited set of formulations. Moreover, these novel membranes are useful in removing dyes or solid particles such as salt or proteins from liquid dispersions. Other applications include concentrating dilute salt solutions, and gas mixture separation procedures.

We claim:

1. A membrane characterized by a water content of 5–75% and a diffusivity greater than about $10^{-8}$ cm$^2$/sec. comprising a polymer containing polyamideamine functional group of the formula:

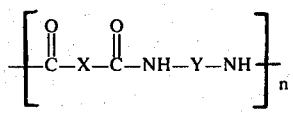

wherein:

X is selected from the group consisting of $R_1$,

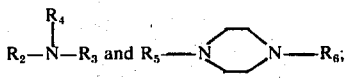

Y is selected from the group consisting of $R_7$,

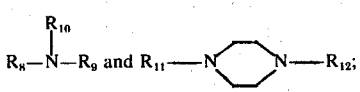

wherein:

$R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bis-phenylene alkylene and substituted diradicals thereof wherein the substituents are selected from the group consisting of oxygen, sulfur and nitrogen; and wherein:

$R_4$ and $R_{10}$ are organic radicals selected from the group consisting of alkyl, cyclic alkyl and phenyl; with the proviso that at least one of X and Y as defined above contains a tertiary amine group;

and wherein:

n is an integer designating the repeating monomeric units of the polymer.

2. The membrane of claim 1 wherein the polyamideamine-containing polymer is poly [1. 7(4-methyl) azaheptyladipamide].

3. The membrane of claim 1 wherein the polyamideamine-containing polymer is a co-polymer of poly [1, 7(4-methyl) azaheptyladipamide] and hexamethyleneadipamide.

4. The membrane of claim 1 wherein 5 to 95% of a membrane matrix polymer is added to the polyamideamine containing system.

5. The membrane of claim 4 wherein the matrix polymer is a polyamide.

6. The membrane of claim 1 wherein 0.5 to 50% of a processing additive is added prior to and removed after membrane formation.

7. The membrane of claim 1 comprising 30–60% poly [1, 7(4-methyl) azaheptyladipamide], 30–60% ε-caprolactam and 10–30% lauryl lactam.

8. The membrane of claim 1 in the form of a flat membrane.

9. The membrane of claim 1 in the form of a hollow fiber.

10. A process for the production of a membrane having a diffusivity greater than $10^{-8}$ cm$^2$/sec. and controllable hydrophilicity comprising the steps of:
   1. casting a solution of a polymer containing a polyamidiamine functional group of the formula;

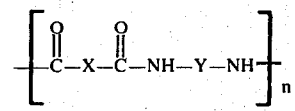

wherein:

X is selected from the group consisting of $R_1$,

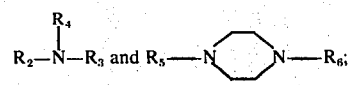

Y is selected from the group consisting of $R_7$,

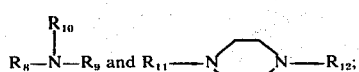

wherein:

$R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bis-phenylene alkylene and substituted diradicals thereof wherein the substituents are selected from the group consisting of oxygen, sulfur and nitrogen; and wherein:

$R_4$ and $R_{10}$ are organic radicals selected from the group consisting of alkyl, cyclic alkyl and phenyl; with the proviso that at least one of X and Y as defined above contains a tertiary amine group; and wherein:

n is an integer designating the repeating monomeric units of the polymer; and 2. drying to form an asymmetric membrane.

11. The process of claim 10 wherein the 5 to 95% of a matrix polymer is added to the polyamideamine-containing solution.

12. A process for the production of a membrane having a diffusivity greater than $10^{-8}$ cm$^2$/sec. and controllable hydrophilicity comprising the steps of:
 1. melting a polymer containing a polyamideamine functional group of the formula:

$$\left[ -\overset{O}{\overset{\|}{C}}-X-\overset{O}{\overset{\|}{C}}-NH-Y-NH- \right]_n$$

wherein:
 X is selected from the group consisting of $R_1$, $$R_2-\overset{R_4}{\underset{|}{N}}-R_3 \text{ and } R_5-N\overset{\frown}{\underset{\smile}{\phantom{xxx}}}N-R_6;$$

Y is selected from the group consisting of $R_7$, $$R_8-\overset{R_{10}}{\underset{|}{N}}-R_9 \text{ and } R_{11}-N\overset{\frown}{\underset{\smile}{\phantom{xxx}}}N-R_{12};$$

wherein:
 $R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bis-phenylene alkylene and substituted diradicals thereof wherein the substituents are selected from the group consisting of oxygen, sulfur and nitrogen; and
wherein:
 $R_4$ and $R_{10}$ are organic radicals selected from the group consisting of alkyl, cyclic alkyl and phenyl; with the proviso that at least one of X and Y as defined above contains a tertiary amine group; and wherein:
 n is an integer designating the repeating monomeric units of the polymer.
 2. extruding the melt;
 3. quenching to produce pellets; and
 4. extruding the pellets to produce a polymeric balloon, tube or hollow fibre.

13. The method of claim 12 wherein 5 to 95% of a matrix polymer is added to the polyamideamine containing solution.

14. The method of claim 12 wherein 0.5 to 50% of a processing additive is added to the solution and removed after drying the membrane.

15. In a solvent extraction process which comprises the steps of contacting one side of a membrane with a first liquid B containing a solute material A and contacting the other side of said membrane with an extracting second liquid C which is substantially immiscible with liquid B, maintaining the separation of liquids B and C by said membrane and extracting by diffusion said solute A from liquid B through said membrane and into said liquid C by maintaining said liquids on the respective sides of said membranes until said solute A has been substantially diffused into liquid C, the improvement which comprises extracting said solvent through a membrane containing a polyamideamine functional group of the formula:

$$\left[ -\overset{O}{\overset{\|}{C}}-X-\overset{O}{\overset{\|}{C}}-NH-Y-NH- \right]_n$$

wherein:
 X is selected from the group consisting of $R_1$, $$R_2-\overset{R_4}{\underset{|}{N}}-R_3 \text{ and } R_5-N\overset{\frown}{\underset{\smile}{\phantom{xxx}}}N-R_6;$$

Y is selected from the group consisting of $R_7$, $$R_8-\overset{R_{10}}{\underset{|}{N}}-R_9 \text{ and } R_{11}-N\overset{\frown}{\underset{\smile}{\phantom{xxx}}}N-R_{12}$$

wherein:
 $R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bis-phenylene alkylene and substituted diradicals thereof wherein the substituents are selected from the group consisting of oxygen, sulfur and nitrogen; and
wherein:
 $R_4$ and $R_{10}$ are organic radicals selected from the group consisting of alkyl, cyclic alkyl and phenyl; with the provisio that at least one of X and Y as defined above contains a tertiary amine group;
and wherein:
 n is an integer designating the repeating monomeric units of the polymer.

16. In a solvent extraction apparatus which comprises a diffusion cell with a plurality of compartments, said compartments being separated by a membrane, the improvement which comprises a polymeric membrane having a diffusivity greater than about $10^{-8}$ cm$^2$/sec. and containing a polyamideamine functional group of the formula:

$$\left[ -\overset{O}{\overset{\|}{C}}-X-\overset{O}{\overset{\|}{C}}-NH-Y-NH- \right]_n$$

wherein:
 X is selected from the group consisting of $R_1$, $$R_2-\overset{R_4}{\underset{|}{N}}-R_3 \text{ and } R_5-N\overset{\frown}{\underset{\smile}{\phantom{xxx}}}N-R_6;$$

Y is selected from the group consisting of $R_7$, $$R_8-\overset{R_{10}}{\underset{|}{N}}-R_9-R_{11}-N\overset{\frown}{\underset{\smile}{\phantom{xxx}}}N-R_{12}$$

wherein:
 $R_1$, $R_2$, $R_3$, $R_5$, $R_6$, $R_7$, $R_8$, $R_9$, $R_{11}$ and $R_{12}$ are organic diradicals independently selected from the group consisting of alkylene, cyclic alkylene, phenylene, phenyl dialkylene, bis-phenylene alkylene and substituted diradicals thereof wherein the substituents are selected from the group consisting of oxygen, sulfur and nitrogen; and wherein:

$R_4$ and $R_{10}$ are organic radicals selected from the group consisting of alkyl, cyclic alkyl and phenyl;

with the proviso that at least one of X and Y as defined above contains a tertiary amine group;

and wherein:

$n$ is an integer designating the repeating monomeric units of the polymer.

* * * * *

UNITED STATES PATENT AND TRADEMARK OFFICE
CERTIFICATE OF CORRECTION

PATENT NO. : 3,951,789
DATED : April 20, 1976
INVENTOR(S) : Lester T. C. Lee, Win-Sow Ho and Kang-Jen Liu It is certified that error appears in the above-identified patent and that said Letters Patent are hereby corrected as shown below:

Column 2, line 13, "to" should be -- no --.

Column 3, line 25, "$R_2$", second occurrence, should be -- $R_{12}$ --.

Column 4, line 26, delete "a".

Column 6, line 3, "bis-henylene" should be -- bis-phenylene --.

Column 13, line 23, "/sec." should be -- preparation --.

Column 16, Table III, the first line of the last four column headings should read as follows:

-- Cil        Cio        Col        Coo --

Column 16, Table III, Run No. 2, under column heading "CiO ($10^{-6}$ gm/ml) (ppm)", "r0" should be -- ~0 --.

Column 18, claim 2, line 5, "[1. 7(4-methyl)aza-" should be -- [1, 7(4-methyl)aza- --.

Signed and Sealed this

Twentieth Day of July 1976

[SEAL]

Attest:

RUTH C. MASON
*Attesting Officer*

C. MARSHALL DANN
*Commissioner of Patents and Trademarks*